May 5, 1959 W. L. HUDSON 2,885,126
MAGNETICALLY DRIVEN TANK PUMP APPARATUS
Filed Oct. 5, 1955 3 Sheets-Sheet 1

INVENTOR.
WILLIAM L. HUDSON,
BY
*Schley Dark & Jenkins*
ATTORNEYS.

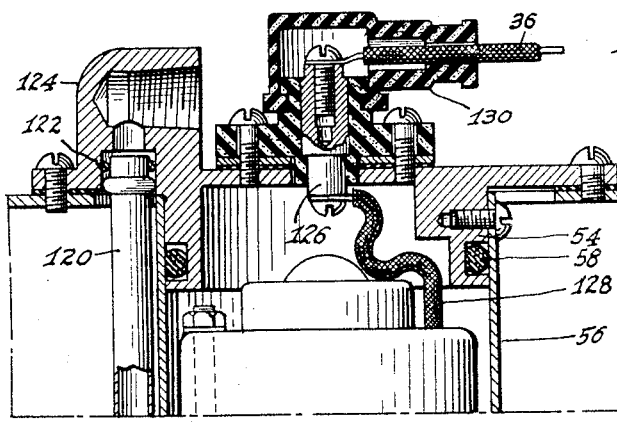
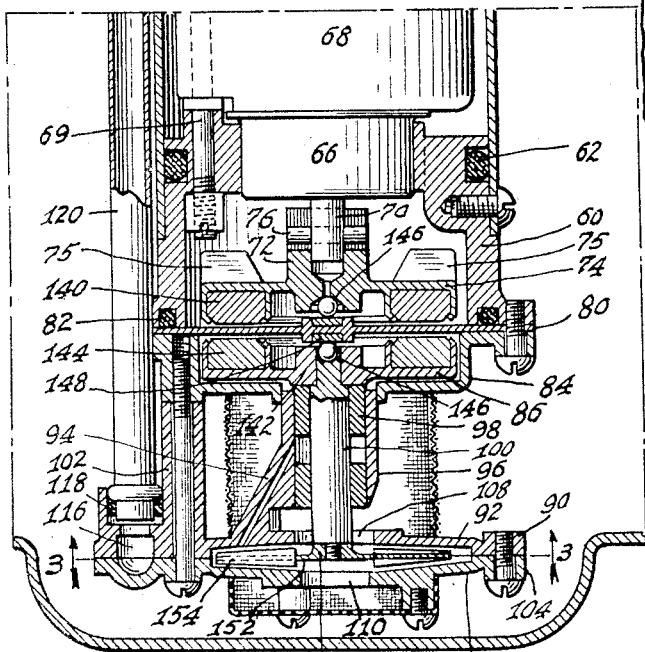
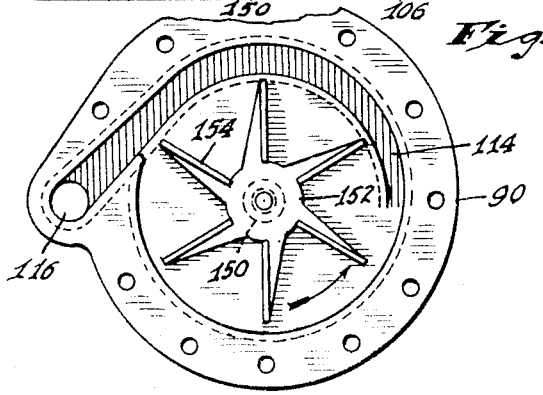

INVENTOR.
WILLIAM L. HUDSON,
BY
ATTORNEYS.

United States Patent Office 2,885,126
Patented May 5, 1959

2,885,126

MAGNETICALLY DRIVEN TANK PUMP APPARATUS

William L. Hudson, Fort Wayne, Ind., assignor to Tokheim Corporation, Fort Wayne, Ind., a corporation of Indiana Application October 5, 1955, Serial No. 538,753

19 Claims. (Cl. 222—333)

This invention relates to liquid pumping means and the combination thereof with a supply tank and driving means, and is directed especially to the provision of automotive fuel supply apparatus in which a pump in open gravity-flow inlet communication with, and preferably submerged in, a gasoline or other fuel tank is driven by an electric motor sealed from the tank, with the driving torque transmitted from the motor to the pump through an imperforate sealing wall by a magnetic coupling. The pump used is preferably an impeller pump, and most desirably a centrifugal pump of the type disclosed in the copending application of George W. Wright, Serial No. 514,221, filed June 9, 1955.

Many attempts have been made to mount a fuel pump directly in an atomotive fuel tank to receive fuel by gravity flow in the tank and deliver it to the automotive engine under pressure, in order to provide an improved system and especially to minimize vapor-lock problems occurring in suction systems. Both wet and dry motors have been proposed for driving such a pump. With wet motors, the fuel is admitted to the interior of the motor, and not only creates danger of fire or explosion from the motor-brush sparking in the presence of the inflammable fuel or its vapor but also presents other and serious problems, especially that of providing effective brush contact with the commutator of the motor. The fuels are generally poor electrical conductors and have good dielectric properties. If brush pressures are made sufficient to transmit the operating current to the commutator, excessive wear occurs and excessive drag load is imposed on the motor, often in excess of the pumping load; with the result that brush and motor costs are high, operating life is short, and power consumption is excessive. With dry motors, difficult sealing problems occur, and if sufficient sealing areas and pressures are provided, these increase cost, create high drag loads, and result in excessive power consumption. In both cases, specially built motors are required, of a size and capacity greatly exceeding what is needed for the pumping load alone. The motor and pump combinations which have resulted from these prior proposals have thus been relatively costly to produce and relatively expensive and unreliable in operation.

It is the general object of the invention to provide fuel supply apparatus in which a simple centrifugal pump may be mounted in an advantageous position in a tank and is driven by a motor which is completely sealed from the tank, and thereby to avoid any need for special motor construction and for expensive and load-producing motor seals or brushes, and to relieve the motor of substantially all but the actual pumping load so that a stock motor of standard construction and low cost may be used and will operate at low expense. It is an object of the invention to provide supply apparatus in which a drive housing or compartment is sealed from a fuel tank by an imperforate fixed wall, a pump is mounted in the tank, a driving motor is mounted in the sealed compartment or housing, and driving torque is transmitted from the motor to the pump by a magnetic coupling operating through the imperforate wall. It is an object of the invention to provide a unitary motor and pump assembly which may be mounted in a tank, as from the walls thereof, with a driving motor contained in a compartment sealed from the tank, which actuates a magnetic coupling to drive a pump mounted externally of the sealed compartment in open inlet communication with, and preferably submerged in, the fuel in the tank. It is an object of the invention to permit the motor to be a completely sealed unit so that it may contain an inert gas or other controlled atmosphere, or to be sealed from the interior of the tank and vented or otherwise exposed to the atmosphere outside the tank.

It is an object of the invention to provide an improved magnetic coupling especially adapted for use in a motor and pump combination, and to provide an improved combination of the same with a motor and pump; in which the coupling is adapted for submerged operation in fuel such as gasoline, will have a strong coupling effect for its size, will retain its coupling effect under the adverse conditions of automotive use, and will have advantageous physical characteristics. It is an object of the invention to provide a combination of motor, magnetic coupling, and pump, in which the magnetic coupling will stay in synchronism under all normal operating conditions and transmit all normal torque loads, but will lose synchronism and slip if an abnormal torque load occurs, to prevent damage both to the motor and to the pump. It is an object of the invention to combine a driving motor, a centrifugal pump which requires low starting torque, and a magnetic coupling which has limited "pull-in" characteristics, with the parts so interrelated that the coupling parts will stay in synchronism and transmit operating torque under all normal starting and pumping conditions, but in the event of an abnormal load, for example, if the pump should become obstructed or locked by some foreign body, will lose synchronism and will thereafter have a relatively low coupling effect, so that after loss of coupling synchronism the motor will rotate relatively freely under a reduced load and will not overheat and create danger of fire or explosion in the fuel tank.

It is an object of the invention to provide a combination of motor, magnetic coupling, and pump in which the driven element of the coupling, although located in a submerged position in a tank outside the sealed drive housing, will normally operate in a gaseous medium and avoid frictional drag from surrounding liquid.

In accordance with the invention, a drive mounting or compartment is combined with a tank and separated therefrom by an imperforate wall adapted to lie between the driving and driven elements of a magnetic coupling. A driving motor is operatively connected to and desirably carries the driving element of the magnetic coupling, and the resulting drive combination is positioned adjacent the outer side of the imperforate wall, as in the compartment separated from the tank by such wall. The driven element of the magnetic coupling is rotatably mounted on the opposite side of the imperforate wall, in coaxial and magnetic coupling relation with the driving element. The pump is operatively connected to the driven coupling member, and is desirably a centrifugal pump, which has low starting torque. The pump impeller may be mounted on a common shaft with the driven element of the coupling, and is desirably an open impeller of a hydraulically-balanced, double-ended type which rotates with clearance within the pump housing, free from rotatory seals or other close-running parts, and is thus a free-starting rotor.

While other arrangements may be used, the imperforate wall is preferably a flat wall lying normal to the axis of rotation of the coupling, and the magnetic coupling members preferably lie on opposite sides of such wall and are coupled by a field extending in an axial direction through the radial wall. While in the broad combination aspects of the invention, other magnetic couplings may be used, the preferred coupling comprises a pair of permanent magnet members or assemblies having poles facing each other in an axial direction through such wall and thereby coupled for synchronous operation without relative slip. Preferably, the magnetic elements are annular magnets, each magnetized to form a plurality of pairs of angularly-spaced, alternately-polarized poles at its end face which lies toward the companion magnet and toward the intervening imperforate wall. The annular magnets are desirably formed of ferrite magnet material, pressed to shape and heat treated and magnetized in accordance with known practice. The ferrite material and its process of fabrication permits the magnets to be made inexpensively in advantageous and accurate physical shape with good static and dynamic balance, and provides especially stable and desirable magnetic properties, and provides light weight magnets in which the poles are spaced a relatively large distance radially from the axes of rotation, and hence in position to have a relatively large torque arm.

The thrust forces arising from the attraction of the driving and driven elements are desirably taken by a thrust bearing carried by the imperforate wall between the two elements. The driving element is desirably connected to the motor by a telescopic joint, which isolates the thrust forces of the motor from the coupling and isolates the motor from thrust forces of the coupling and pump, and this contributes to the feasibility of employing a stock motor of inexpensive construction, and facilitates the use of a thin disk as the imperforate wall. The pump, as has been noted, is desirably a double-ended, open, free-starting centrifugal pump in which the rotor is hydraulically balanced against end thrust. Small thrust forces which may occur can be taken by the magnetic coupling and its thrust bearing, those in the direction of attraction between the coupling elements being taken by the thrust bearing between those elements, and those in the opposite direction being opposed by the much stronger axial attraction between the magnetic elements. The assembly of the driven magnetic coupling element and the pump rotator on a common shaft can thus be supported by simple radial bearings. These can be lubricated by the fuel in which they are normally submerged and lubrication can be insured by diverting part of the pump discharge to such bearings.

With a free-starting centrifugal pump, as preferred, the coupling may have, and desirably does have, limited "pull-in" characteristics. In driving relation, the elements of the coupling are angularly positioned with opposite magnetic poles of the two magnets together in axially spaced substantial alinement and the magnetic attraction maintins the elements in that relatively fixed angular relation, and the coupling parts rotate in synchronism. If, however, the elements are angularly displaced beyond certain limits, as by excessive torque, the unlike poles are separated and like poles are brought together, and the magnetic coupling effect is lost. The coupling elements then break away from driving relation. A once-lost coupling effect between two magnets will normally continue, with little or no coupling torque transmitted, especially as the speed and momentum of the driving element increases with respect to the driven element. By "pull-in" characteristics is meant the ability to recover a once-lost driving relation.

In the combination of this invention, the coupling desirably has a limited ability, and may have substantially no ability, to recover a once-lost driving relation, until the elements are substantially stopped and allowed to regain driving relation under small-load conditions. The torque transmitting ability of the coupling must exceed the load torque required by the pump under all normal starting or running conditions. The break-away torque of the coupling, at which the coupling will initially lose driving relation, should, in accordance with the invention, be less than the starting torque of the motor. Preferably, the coupling-loss-maintaining torque should be less than the running torque of the motor. Accordingly, if the pump should become locked, the motor will not be stalled, but will start and break the driving relation of the coupling. As it and the driving element increase in speed, the loss of coupling effect is maintained by decreasing torque, and will persist with the motor subjected to a load well within its normal operating conditions. While no pumping will occur, this will serve to indicate that fault exists, and the motor will operate safely and without overheating as long as it remains energized.

In a preferred form of the invention, the motor and driving element of the coupling are mounted in a drive housing closed at its lower end by the imperforate magnetic-field-transmitting wall, with the driving element in running clearance relation adjacent the inner face of such wall, and the housing is sealed from communication with the tank in which it is mounted. The pump and driven element are supported in unitary relation with the drive housing, with the driven element in running clearance relation with the outer face of the imperforate wall, in coaxial and magnetically coupled relation with the driving element. The pump is spaced from the coupling, to provide space for inlet flow to the adjacent side of the pump. The pump rotor and the driven element of the coupling are desirably on a common shaft mounted in radial bearings preferably positioned between the rotor and the coupling. Thrust bearings carried by the imperforate wall between the coupling elements carry the thrust of magnetic attraction and position the pump rotor in proper relation with the pump housing. The assembly is provided with mounting means, for mounting in a tank, with power leads to the motor and a discharge fuel line from the pump, and is adapted for mounting on and removal from a tank as a unit.

When the driven coupling member lies in submerged position in the tank, it is desirably positioned above the pump and below the imperforate wall, and is desirably enclosed by a bell like housing which is open only at the bottom and preferably is open only to a restricted extent, such as is required for manufacturing clearances with the pump shaft or its bearings. With such a bell housing, fuel such as gasoline in the housing will be vaporized by the agitation of operation and liquid will be displaced by the vapor entrapped in the bell housing, with the result that the driven coupling member will rotate in a gaseous environment rather than in liquid and drag will thereby be reduced. To enhance this result, gas separated from the liquid in the tank, as at the axis of the pump, may be discharged to the bell housing, conveniently by way of a central bore in the pump shaft.

The accompanying drawings illustrate the invention. In such drawings:

Fig. 2 is a vertical section of a fuel pump and motor unit in accordance with the invention, in the form of a built-up assembly adapted for automotive use;

Fig. 3 is a bottom section taken on the line 3—3 of Fig. 2, i.e., a bottom plan view of the pump of Fig. 2 with the bottom half of the pump casing removed;

Fig. 4 is a top plan view of the assembly shown in Fig. 2;

Figure 1:
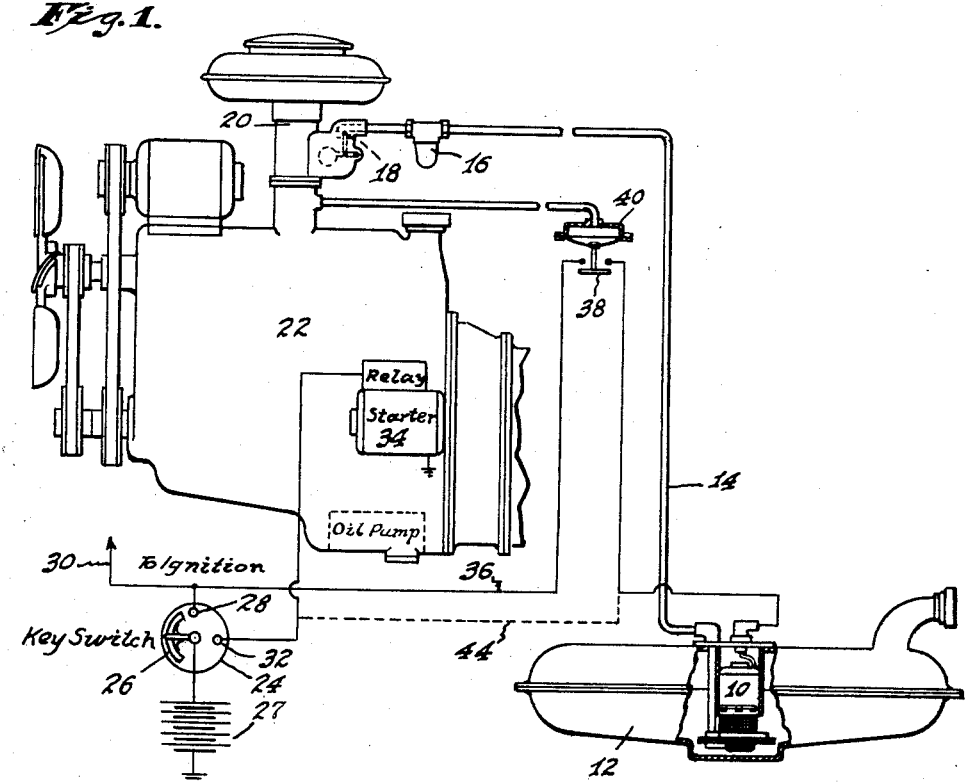
Fig. 1 is a somewhat schematic diagram of an automobile fuel system embodying the invention.

The system shown in Fig. 1 includes a pump and motor assembly 10 mounted as a depending unit in a fuel tank 12 and connected by a fuel line 14 through a filter 16 to the float-controlled inlet valve 18 of the carburetor 20 for an automotive engine 22.

The ignition system of the engine 22 is controlled by a key-actuated switch 24 having a movable contact 26 connected to a battery 27, and having a fixed contact 28 connected to the ignition circuit 30. The switch may also have a second fixed contact 32 connected to the actuating relay for the engine starter 34. In normal running, the movable contact 26 closes an ignition circuit to the first fixed contact 28. For starting, the movable contact 26 is moved beyond this normal running position to engage both the first contact 28 and the second fixed contact 32, and then closes both the ignition circuit and the starter relay circuit. The motor of the fuel pump 10 is energized by a line 36 in parallel with the ignition circuit 30, and preferably includes a switch which is responsive to engine operation. As shown, this switch is a normally open switch 38 actuated to closed position by a sensitive vacuum-responsive motor 40, responsive to intake vacuum of the engine 22. If desired, the pump can also be energized in response to starter actuation, as through the line 44 (shown in dotted lines) connected in parallel with the starter relay circuit.

The pump and motor assembly shown in Figs. 2 through 4 comprises a mounting plate 50 secured about the edges of an opening in the top wall 52 of the fuel tank 12. A central depending collar 54 on the plate 50 carries a cylindrical motor housing shell 56, sealed to the collar 54 by an O-ring gasket 58. A motor support casting 60 is received and secured in the lower end of the tube 56, and sealed thereto by an O-ring gasket 62. The upper end of the casting 60 is formed to receive the bearing boss 66 at the lower end of the motor 68, and the motor is supported by the casting 60 and is secured in place by bolts 69.

The motor shaft 70 is carried by radial and thrust bearings in the motor, and projects downward. Its lower end slidably receives the hub 72 of the driver member 74 of a magnetic coupling and is drivingly connected thereto by a cross pin 76 engaged in a slot in the hub 72. The shaft thus centers and drives the driver member 74, but neither member transmits or receives thrust from the other. The lower end of the motor support casting 60 is closed by an imperforate wall or diaphragm 80, sealed thereto by an O-ring gasket 82 and clamped in place by a housing 84 for the driven member 86 of the magnetic coupling.

A pump body 90 is secured to this assembly below the housing 84, and is spaced therefrom by a series of spacing posts 102. The body 90 forms the upper wall 92 of the pump casing, and such wall carries one or more struts 94 extending diagonally upward and inward to support a central bearing sleeve 96 which fits into a central opening in the housing 84 and houses a pair of spaced sleeve bearings 98 for the pump shaft 100. A passage in one of the struts 94 carries fuel from the pressure side of the pump to the space between the bearings 98 for lubrication. A pump cover 104 forms the bottom wall 106 of the pump casing.

The two pump casing walls 92 and 106 have central openings to form axially opposite top and bottom inlet throats 108 and 110, and define a thin annular pumping chamber which extends outward from between the throats. Such chamber openly communicates with a volute 114 formed in the body and cover, and this leads tangentially through a pump delivery passage 116 to a socket 118 for the lower end of a pump discharge pipe 120. The pipe is received between that socket 118 and an opposed socket 122 in the mounting plate 50, and is sealed to each socket by an O-ring gasket.

The top socket 122 connects with a discharge fitting 124 adapted to be joined to the fuel line 14.

One side of the motor 68 is grounded, and the other side is connected by a lead 128 to a terminal post 126 extending through an insulating fitting on the mounting plate. The pump-motor line 36 may be connected to the post 126, and the connection is protected by an enclosing shield 130.

The imperforate wall or diaphragm 80 is made of non-magnetic material, such as stainless steel, brass, or a non-conductive material. As shown, the wall 80 is a stiff disk of synthetic resin material reinforced with fiber. It is completely imperforate, and the entire assembly above it is completely closed and sealed from the fuel in the tank. Both the driving member 74 of the magnetic coupling and especially the motor 68 are thus isolated from the tank and operate dry, with suitable lubrication, in an atmosphere free of fuel and fuel vapor. The motor chamber may be vented to the atmosphere through a screened opening 132 in the mounting plate 50. Alternatively, the closed assembly may be sealed, and filled with a gas which provides an atmosphere favorable to motor operation.

The driving member 74 of the magnetic coupling is of circular shape, and carries two spaced depending annular walls, which form a seat for an annular permanent magnet 140. This has chamfered lower-corners and is fixed in its seat by deforming the walls over those chamfered corners. The magnet is magnetized, preferably after assembly, to provide spaced magnetic poles at its bottom face. Preferably, four such poles are used, of alternate polarity. The member 74 may carry fan blades 75 on its top surface, to circulate air through the motor. The driven member 86 of the magnet coupling is of similar construction, with a central hub 142 and two upstanding spaced annular walls which form a magnet receptacle. A companion annular permanent magnet 144 is secured therein, and is magnetized like the magnet 140 but with its poles at its top face.

Each coupling member 74 and 86 has a central thrust bearing seat 146, and thrust balls are interposed between such seats 146 and a pair of thrust plates 148 inserted in a thickened portion at the center of the wall 80. The thrust arising from the traction between the permanent magnets 140 and 144 is taken directly by this central thrust bearing structure and is not imposed on the housings or on either the motor bearings or the pump shaft bearings. The driven coupling member 86 is fixed on the pump shaft 100 and is centered thereby, and the magnetic traction holds the coupling and shaft upward in the position determined by the bottom thrust insert 148 of the wall 80.

The pump impeller shown in Figs. 2 and 3 comprises a small central hub 150 threaded onto the pump shaft 100, with a circular web 152 extending radially therefrom in the central plane of the pumping chamber, and with a series of circumferentially spaced impeller blades 154 carried at the edge of the web. The blades shown are T-shaped in cross section. Their reinforcing central ribs are integral with the web 152 and extend in its plane along the leading faces of the blades. From the central rib of each blade, the blade edges stand upward and downward into running clearance with the pumping chamber walls 92 and 106. The top and bottom blade halves are of the same height and of the same radial length. The impeller is thus symmetrical with respect to the central plane of the pump, and is hydraulically balanced. The blades are tapered outwardly, and the pumping chamber walls 92 and 106 have a corresponding shallow conical shape. The circumferential spacing of the blades about the circular web 152 leaves relatively large open spaces between them, and such spaces extend inward to the inner ends of the blades. With such spacing, liquid from either throat can freely cross the central plane of the pump to fill the impeller, pressure will be equalized across the whole axial width of each blade, and any air or gas in the pumping chamber can freely rise to the top of that chamber for escape through the top throat 108.

As is desirable in an automotive fuel supply system, the pump disclosed avoids beating and agitation and excessive swirling of the fuel in the tank, to preserve the fuel in liquid state for delivery to the engine. The coupling cooperates in this desirable result. Each member, and especially the coupling driven member, is wholly defined by smooth surfaces of revolution, which reduces frictional drag and permits the driven member to be housed in a housing 84 conforming to its shape and spaced from its surfaces by optimum and uniform clearances which are sufficient to avoid drag from shear resistance in the liquid but which contain only small volumes of liquid exposed to the swirling action of the rotating parts. The driven coupling member lies close above the pump to minimize the height of the assembly and to provide space for liquid flow to and gas flow from the top inlet of the pump. Its casing 84 prevents its rotation from swirling the liquid adjacent the pump and from affecting the desired operation of the pump. Preferably, the housing about the driven member is closed and sealed at all points above the bottom of the coupling driven member, and forms a bell-type housing adapted to entrap and hold gas which may be present therein, as from the vaporization of volatile fuel. With such gas in the housing, the driven coupling member rotates in a gaseous environment rather than in liquid, which further reduces drag. As shown, the housing 84 is open to the tank only through the bearing clearances and through the joint between the lip 142 and the bearing sleeve 100.

Figure 5:
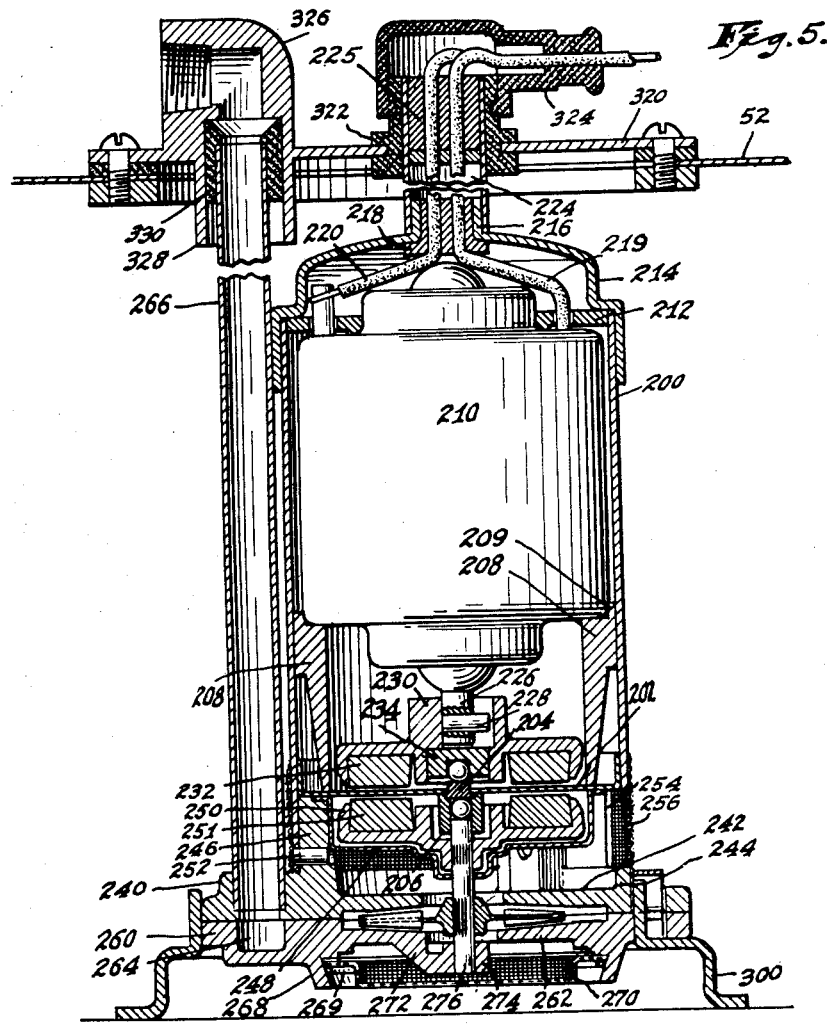
Fig. 5 is a vertical section of a preferred modification of pump-motor unit adapted for quantity production for automotive vehicle use, associated with a preferred mounting.

The assembly shown in Fig. 5 is adapted for quantity production as a substantially permanently assembled unit. The main body of the assembly comprises a tubular shell 200, conveniently made of commercial tubing. A diaphragm 202 is inserted in its lower end, and is fixed and sealed in place as by soldering. The center of the diaphragm 202 carries a thrust bearing insert 204 and a depending sleeve bearing 206, which are secured and sealed to the diaphragm as by welding or soldering. Above the diaphragm 202, the shell 200 receives a motor-supporting spacer 208 which may be molded from a synthetic resin material such as nylon and is generally cylindrical in shape. It rests on the diaphragm, and its upper portion fits closely within the shell 200. At three spaced points around its upper edge, it is provided with upward extensions 209 to center the motor 210 within the shell 200.

The motor assembly 210 is inserted within the shell 200 to rest on the upper face of the spacer 208. It is held down, and its upper end is centered, by a stabilizing plate 212 molded of synthetic resin such as nylon. The stabilizing plate is held in place, and the upper end of the shell 200 is closed, by a cap 214 which has a central tubular upward extension 216. This receives a grommet 218 through which the motor leads are passed. Such leads include a live lead 219 and a ground lead 220, the latter being connected to one of the bolts which hold the motor assembly 210 together. The tubular extension 216 of the cap 214 is connected and sealed to a conduit 224 which carries the motor leads and serves to stabilize the mounting of the unit on the bottom tank wall. The conduit may be sealed, as with a mass of sealing compound 225.

The motor shaft 226 is carried by radial and thrust bearings in the motor 210 and its lower end projects downwardly and is provided with a drive pin 228. The driver member 230 of a magnetic coupling is slidably and drivingly mounted on the end of the shaft 226 and carries an annular magnet 232. The magnet is desirably a pressed ferrite magnet, magnetized after assembly to provide four circumferentially spaced poles at its lower face. The member 230 may be an anodized aluminum casting provided at its center with a hardened cup-shaped thrust bearing insert 234 which rides on a thrust ball between itself and the diaphragm insert 204.

The shell 200 projects a short distance below the diaphragm 202 and receives a pump body casting 240. Such casting forms the upper wall 242 of the pump casing and has a rim 244 which abuts the lower edge of the shell 200. Three circumferentially spaced posts 246 extend upward from the pump body 240 and fit closely within the lower end of the shell 200. Their upper ends abut the lower face of the diaphragm 202 and support a shroud 248 which forms a housing for the driven member 250 of the magnetic coupling. The pump body 240 is conveniently secured in place by one or more pins 252 pressed into aligned holes in the shell 200 and the legs 246.

The lower end of the shell 200, between the posts 246, is punched to provide inlet openings 254, and these are covered by a screen 256 wrapped around the lower end of the shell 200 and overlapping the rim 244 of the body 240.

The lower half of the pump casing is formed by a cover 260, which may be molded of a synthetic resin material such as nylon. It provides the lower wall 262 of the pump housing. A volute 264 is formed by the pump body and cover, around the pump chamber, and leads to a socket in the pump body 240 which receives the lower end of the discharge pipe 266.

The bottom throat of the pump is formed in the bottom pump casing wall 262 and is bridged by a spider 272 which supports a bearing sleeve 274 for the lower end of the pump shaft 276. The bearing sleeve may be integral and homogeneous with the cover 260 when that cover is made of a bearing material such as nylon. The bottom throat is protected by a screen 270 fitted within a tapering collar 268 on the body 260 and held in place by a snap ring 269.

The pump shaft 276 is journaled at its ends in the sleeve bearing 206 on the diaphragm and in the bearing sleeve 274 of the pump cover. Its upper end face forms a thrust bearing riding against a thrust ball received between it and the diaphragm insert 204.

The driven member 250 of the magnetic coupling is similar in construction to the driver member 230 and carries a companion magnet 251 magnetized to provide magnetic poles at its upper face in positions for alignment with the poles of the driving magnet 232. The driven member 250 is fixed on the upper end of the pump shaft 276, as by a press fit on a knurled section of the shaft, and the magnetic traction holds the shaft upward against the thrust bearing and fixes its axial position. The shroud 248 encloses the driven member 250 to prevent agitation and stirring of the liquid in the tank by the rotation of that member 250.

The pump impeller in Fig. 5 is generally similar to that shown in Figs. 2 and 3, both in construction and in its relationship to the top and bottom throats of the pump casing. It has a central hub which is pressed on a knurled section of the pump shaft 276 and has a circular central web of smooth and uninterrupted surface configuration within the throats of the pump, and such web supports spaced impeller blades which revolve in the pump chamber defined by the walls 242 and 262.

The pump of Fig. 5 is mounted on the bottom wall of the tank by a bracket 300 engaged with flanges on the pump body 240 and cover 260. The details of such mounting are shown in the aforesaid application of George W. Wright, Serial No. 514,221.

The top wall 52 of the fuel tank is provided with a suitable opening for insertion of the pump-motor assembly, and such opening is closed by a cover plate 320. Such cover plate has a central opening containing an elastic grommet 322 to closely embrace the upper end of the conduit 224 at the top of the motor and pump assembly. The upper end of the grommet 322 is closed by a terminal shield 324 through which the leads 219 and 220 are passed. The plate 320 also carries a pump discharge fitting 326, in communication with a depending socket 328 which receives the upper end of the pump discharge pipe 266. The upper end of such pipe desirably carries an elastic grommet 330 which frictionally engages the wall of the socket 328.

The mounting positions the pump unit wholly within the tank, in position to be completely submerged by the liquid therein. In case the tank is too shallow to receive the full length of the pump unit, its upper end may extend through the cover plate to leave the unit only partially received in the tank. In either case, the motor 210 and the driving member 230 of the coupling are completely enclosed in the compartment formed above the imperforate wall or diaphragm 202, and such compartment is hermetically sealed from the tank. The compartment may be permitted to breathe to the atmosphere outside the tank, by providing for leakage past the grommet 218 in the conduit 224 and along the wire leads 219 and 220 where they pass through the terminal shield. Preferably, however, the assembly is sealed as by applying a sealing compound 225, such as litharge, around the wire leads in the conduit 224, and in such case, the motor compartment may be filled with a controlled atmosphere favorable to motor operation and life.

Operation of the motor rotates the driver 230 of the magnetic coupling, and the driven member 250, being magnetically coupled thereto, is driven at the same speed. The torque required for normal operation of the small centrifugal pump is readily transmitted by the coupling, and the coupling effect is desirably limited to a value sufficient for normal pump operation but less than the normal torque of the motor and less than sufficient to reestablish itself during operation once it is broken. If the pump should become locked, the coupling effect would then be broken and the motor would run free, without danger of overheating or burning out.

The pump of Fig. 5 operates in substantially the same way as the pump of Fig. 2. Its surfaces exposed through the throats are non-agitating surfaces and produce no beating and vaporization of the entering liquid and but little swirling or other movement in the surrounding body of liquid. The driven coupling member is housed by the shield 248 to avoid adverse effects on the fluid adjacent the top inlet of the pump. The pump does not become gas-bound even when its throats are exposed to air by the sloshing of fuel in the tank, and resumes pumping immediately on resubmergence of the throats. Air or gas caught in the bottom throat or in the pump is displaced upwardly between the spaced blades and escapes through the top throat. The pump produces effective pumping until the liquid level in the tank (or sump) falls below the top throat of the pump casing, and thus will substantially empty the tank in which it is mounted.

Figure 7:
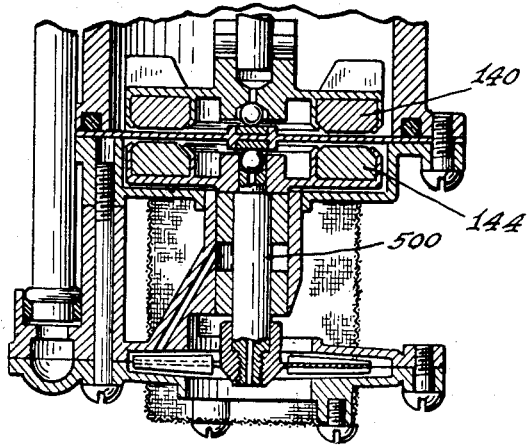
Fig. 7 is a fragmentary vertical section similar to Fig. 2, showing a pump and coupling arrangement adapted to discharge gas to the bell-housing of the driven member of the coupling.

Fig. 7 illustrates a modification of the pump and motor unit shown in Fig. 2, in which the pump casing and the impeller are arranged to produce swirling of the liquid, especially at the bottom throat. The swirling of the liquid forms a vortex, and gas tends to collect at the center of such vortex. To bleed off gas from the center of the bottom throat, the pump shaft 500 contains a central bore which discharges past the thrust ball at the upper end of that shaft and into the housing for the driven member of the magnetic clutch. Gas so discharged displaces liquid from that housing, and provides a gaseous medium rather than a liquid medium about the driven coupling member, to reduce the frictional drag on that member.

Figure 6:
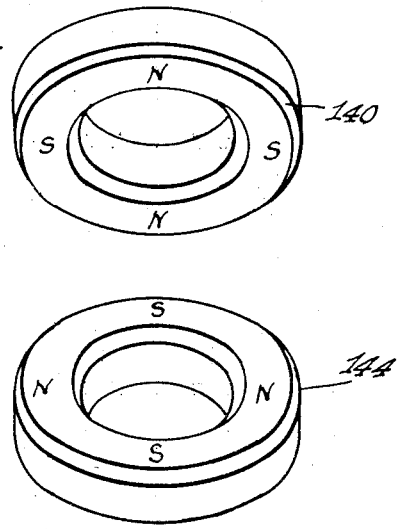
Fig. 6 is an isometric exploded view of a pair of annular magnets for the magnetic coupling.

The magnetic elements used in the magnetic couplings of Figs. 2 and 5 desirably consist of a pair of permanent ring magnets, as shown in Fig. 6, made of ferrite magnet material. Such materials are characterized by properties which in the combination of the present invention give especially advantageous and novel results as compared with other available magnet materials. The ferrite magnet material is abundant and cheap, and magnets made therefrom are sufficiently inexpensive to make the invention practical for commercial use. The magnets can readily be formed to true annular shape with uniform cross section and uniformly distributed mass, and when mounted for rotation on the annulus axis give good balance and a compact structure defined by smooth surfaces of revolution. The magnets are desirably thin, that is, short in an axial direction, to reduce the overall length of the pumping unit, and ferrite magnets can be thin without loss of magnetic strength, and do not require a high length to cross-section ratio as is the case with high-strength Alnico magnets. Magnetic poles of suitable area and high flux density can thus be created on their end faces without requiring great axial length behind such poles, and magnetically opposite high-flux-density poles can lie in closely spaced relation about the magnet ring. A pair of magnets, moreover, has low loss of magnetic attraction when slightly spaced, and little or no loss occurs with the spacing used in the magnetic coupling of this invention. Further, the magnets have extremely high coercive force and high resistance to shock, and thus give especially long life and reliable operation under automotive conditions and in a coupling where loss of coupling relation and demagnetizing conditions may occur and continue under shock conditions. The mass of the material is low which permits the coupling members to have a low moment of inertia while at the same time the annulus radius may be large to give a long torque arm between the axis of rotation and the points at which the coupling field occurs. Still further, the ferrite material is substantially inert and is highly resistant to corrosion and pitting in the presence of fuel and water vapors, and the magnets retain their smooth non-agitating and low-drag surfaces.

As is shown in Figs. 2, 5, and 6, the coupling magnets are made as relatively thin rings, with a cross-section which is short in axial direction and substantially wider in radial direction. Each magnet is magnetized to form at least one pair and desirably a plurality of pairs of magnetic poles at its end face which lies toward its companion magnet, with the poles positioned at angularly spaced points about the face and of consecutively alternate North and South polarity. In Fig. 6, each magnet has two pairs of N and S poles, with two diametrically opposite North poles lying circumferentially between diametrically opposite S poles. In coupled relation, each pole lies in facing alinement with an opposite pole, and remains in that relation during driving operation with the coupling members operating in synchronism without slip.

In the preferred motor and coupling and pump combination, the strength and spacing of the magnets is such as to give a coupling torque greater than the normal pump load torque but less than the motor starting torque. For example, a pump as shown in Fig. 5, having an impeller diameter of about 2 inches or less and operated at a speed of 3000 to 5000 r.p.m. is found to be more than adequate for automobile and road truck use. Such a pump requires an input torque of substantially less than 4 ounce-inches, and is desirably driven by a direct-current motor having a starting torque of the order of 8 ounce-inches through a magnetic coupling having a coupling torque of the order of 6 ounce-inches. The pump impeller and the coupling member and shaft which rotate with it form a free-starting rotor, since the pump imposes little or no load until it approaches running speed, and the rotor as a whole has a low moment of inertia. Accordingly, during starting, the coupling readily starts the rotor without loss of synchronism. During running, the coupling torque is abundantly adequate to drive the pump at motor speed. If, however, the pump fails and is jammed or loaded, as by foreign matter, and the load increases, the coupling releases and thereafter transmits little or no load to the motor but allows it to run relatively free, without danger of overheating. If the pump is jammed or abnormally loaded when the motor starts, the motor torque is adequate to break the coupling effect to release the motor for safe operation.

The use of the magnetic coupling in combination with a driving motor which operates dry and without running seals greatly reduces the power consumption of a submerged automotive pump, and makes it practical for use in commercial automotive vehicles where available power is limited and subject to high demand from other accessory equipment.

I claim as my invention:

1. A pumping unit for pumping liquid from a tank, comprising a centrifugal pump having a casing forming an open central top inlet to admit liquid to the pump by gravity flow from a body of liquid in which the pump is submerged, a pump shaft extending through said inlet, bearing means for said shaft, a driven circular permanent magnet mounted on said shaft above the pump in spaced relation therewith to pass liquid from a surrounding body of liquid to said top inlet, a drive housing including a non-magnetic imperforate wall in field-transmitting relation with the magnet, a driving magnet rotatable on the opposite side of said wall in field-coupled relation with said pump-connected magnet, a motor in said housing and having a shaft drivingly connected to said driving magnet, said housing and its imperforate wall being constructed and arranged to form an imperforate sealed enclosure about said motor and driving magnet to seal the same therein and from the body of liquid in which the pump is submerged.

2. A pumping unit for pumping liquid from a tank, comprising a centrifugal pump having a casing forming top and bottom central inlets for open gravity-flow communication with a surrounding body of liquid in which the pump is submerged, a pump shaft extending through one of said inlets, bearing means for said shaft carried with said casing, a driven circular permanent magnet mounted on said shaft in axially spaced relation with the pump casing to pass liquid to its adjacent inlet, housing means including a non-magnetic imperforate wall in field transmitting relation with said magnet, a drive magnet rotatable on the opposite side of said wall in field-coupled relation with said pump-connected magnet, a motor in said housing and drivingly connected to the driving magnet, said housing and its imperforate wall being constructed and arranged to form an imperforate sealed enclosure about said motor and driving magnet and seal the same therein and from the body of liquid in which the pump is submerged.

3. A pumping unit as defined in claim 2 in which said pump shaft is rotatably supported by bearing means lying between the pump and the pump-connected magnet.

4. A pumping unit as defined in claim 2 with the addition of housing means about the pump-connected magnet to shield the same from contact with liquid entering the adjacent pump inlet.

5. Pumping apparatus, comprising an impeller pump having a casing and a shaft and an impeller carried by said shaft in free-running clearance relation with said casing and having low-load starting characteristics, a ferrite ring magnet coupling member carried by said shaft in free-running clearance from adjacent structure, said shaft and impeller and coupling member forming a unitary rotor, shaft bearing means supporting said rotor for free-starting rotation, a motor, a ferrite ring magnet coupling member operatively connected to said motor and positioned in field-coupled coaxial spaced relation with said shaft-carried coupling member, housing means forming an imperforate sealed enclosure about said motor and motor-connected coupling member and including a non-magnetic imperforate wall between said coupling members in field transmitting relation therewith, the magnets of said members each being permanently magnetized with an annular series of a plurality of pairs of consecutively opposite magnetic poles presented toward said imperforate wall and respectively opposite unlike poles of the other magnet, whereby the coupling members are magnetically coupled through said wall for synchronous coupled operation to drive said rotor at motor speed.

6. Pumping apparatus according to claim 5 in which the coupling torque between said coupling members is less than the starting torque of the motor and greater than the load torque of said rotor, and said coupling members having low pull-in characteristics, whereby upon loss of coupling relation therebetween said motor is effectively uncoupled from the rotor for safe low-load operation.

7. A motor-pump unit adapted for operation submerged in a body of liquid fuel such as gasoline, comprising a motor having a shaft, a casing for enclosing the motor and sealing the same from the fuel, including a non-magnetic imperforate wall disposed adjacent and substantially normal to said shaft, a pump comprising a housing, an impeller within the housing having a shaft and having running clearances with the housing, means for mounting said pump on said casing with said pump shaft substantially perpendicular to said imperforate wall, in substantial alignment with said motor shaft and with said housing a predetermined distance from the imperforate wall, magnetic coupling means comprising a driving member on said motor shaft and a driven member on said pump shaft, said coupling means serving to draw said pump shaft and impeller toward said imperforate wall, and means including said pump shaft and cooperating with said imperforate wall as a stop, to hold said impeller in a predetermined position relative to said housing to maintain said running clearances.

8. Apparatus for pumping liquid fuel such as gasoline from an automotive fuel tank, comprising in combination with the tank, an impeller pump mounted in submerged position in the fuel space in the tank, said pump having a casing forming a pump chamber, a pump rotor in said chamber and mounted on a shaft extending outside said pump casing, bearing means for the shaft carried with said casing, said casing having an inlet in open intake communication with said fuel space to receive fuel therefrom, a coupling driven member mounted on said pump shaft outside said pump casing and within said tank and comprising a ring-shaped permanent magnet, an electric motor sealed from the fuel space within said tank by imperforate wall means including a non-magnetic imperforate wall positioned in field-transmitting relation with said permanent magnet of said driven member, a coupling driving member connected to said motor and separated with the motor from said fuel space by said wall means, said driving member comprising a permanent magnet and being positioned substantially co-axial with said driven member on the opposite side of said non-magnetic wall, said driving and driven members being magnetically coupled through said imperforate non-magnetic wall to transmit torque from said sealed motor to the submerged pump in said tank.

9. Apparatus for pumping liquid fuel as set forth in claim 8 with the addition of shield means cooperating with said non-magnetic imperforate wall and forming therewith an enclosure substantially surrounding said coupling driven member to prevent the same from agitating the fuel in which the pump is submerged.

10. Apparatus for pumping liquid fuel as defined in claim 9 in which said enclosure surrounding said coupling driven member is in the form of a bell housing in which gas may collect about said driven member.

11. Apparatus for pumping liquid fuel as set forth in claim 8 in which the permanent magnets of said coupling driving and driven members are ferrite ring magnets having annular end faces presented toward said non-magnetic wall and each having a plurality of pairs of opposite magnetic poles at its said end face.

12. Apparatus as defined in claim 11 in which said magnets are pressed ferrite magnets having a ring cross-section of greater radial dimension than axial dimension.

13. Apparatus for pumping liquid fuel such as gasoline from an automobile fuel tank, comprising in combination with the tank, an impeller pump mounted in submerged position in the fuel space in the tank, said pump having a casing forming an annular pumping chamber and a central top inlet eye openly connecting said pumping chamber with the surrounding fuel space to admit fuel therefrom to the pump chamber and release gas from the pump chamber to the fuel space, a centrifugal pump rotor in said chamber and mounted on a shaft extending through said eye and outside said pump casing, bearing means for the shaft carried with said casing, a coupling driven member mounted on said pump shaft and spaced from said inlet eye and within said tank thereby providing free communication between said eye and the surrounding fuel space, said driven member comprising a permanent magnet, an electric motor closed off from the fuel space within said tank by imperforate wall means including a non-magnetic imperforate wall positioned in field-transmitting relation with said permanent magnet driven member, shield means cooperating with said non-magnetic wall to form an enclosure substantially surrounding said driven member to prevent the rotation thereof of agitating fuel in the surrounding fuel space, a coupling driving member connected to said motor and closed off with the motor from said fuel space by said wall means, said driving member comprising a permanent magnet and being positioned substantially coaxial with said driven member on the opposite side of said non-magnetic wall, said driving and driven members being magnetically coupled through said imperforate non-magnetic wall to transmit torque from said closed off motor to the submerged pump in said tank.

14. A motor and fuel pump unit adapted to be mounted in submerged position in a liquid fuel tank such as the gasoline tank of an automotive vehicle, comprising a pump casing forming an annular pumping chamber and a top opening therefor in open communication with the outside of the unit to admit fuel to the pump by gravity flow from a surrounding body of liquid and to release gas upward from the pump, a centrifugal rotor in said pump chamber and mounted on a shaft extending upward outside said pump chamber, bearing means for said shaft carried with said casing, a magnetic-coupling driven member mounted on said shaft and spaced above said pump casing to leave passageway for open communication between said top opening and such surrounding body of liquid, shielding means substantially surrounding said driven member and shielding said passageway therefrom, an electric motor in a motor housing above said driven member, said motor housing being formed by imperforate walls which seal said motor from the surrounding fuel space of a tank in which the motor and pump unit is mounted, said walls including a bottom imperforate wall of non-magnetic material lying in field-transmitting relationship with said coupling driven member, a coupling driving member rotatably mounted in said motor housing substantially in axial alignment with said driven member on the pump shaft, said driving member being mechanically driven by said motor within said housing and magnetically coupled to said driven member through said bottom imperforate wall to transmit driving force from said sealed motor to said open submerged pump.

15. A motor and pump unit as defined in claim 14 in which said pump shaft bearing means surrounds said shaft below said coupling driven member and shields the same from liquid approaching said inlet opening.

16. A motor and pump unit according to claim 14 in which said shielding means and imperforate wall form a bell housing for said driven member to trap gas thereabout.

17. A motor and pump unit as defined in claim 15 in which said pump has an open inlet in which gas may occur, with the addition of means to discharge such gas to said bell housing.

18. A motor and fuel pump unit adapted to be mounted in submerged position in a liquid fuel tank such as the gasoline tank of an automotive vehicle, comprising a pump casing forming an annular pumping chamber and central top and bottom eye openings therefor in open communication with surrounding space whereby fluid can freely pass by gravity flow between a surrounding body of liquid and said pump, and gas can escape upward from said pump, an open centrifugal rotor in said pump chamber adapted to pass gas therefrom out said top opening, said rotor being mounted on a shaft extending upward through said top opening, bearing means for said shaft carried with said casing, a magnetic-coupling driven member mounted on said shaft and spaced above said pump casing to leave passageway for open communication between said top opening and such surrounding body of liquid, shielding means substantially surrounding said driven member and shielding said passageway therefrom, an electric motor in a motor housing above said driven member, said motor housing being formed by imperforate walls which seal said motor from the surrounding fuel space of a tank in which the motor and pump unit is mounted, said walls including a bottom imperforate wall of non-magnetic material lying in field-transmitting relationship with said coupling driven member, a coupling driving member rotatably mounted in said motor housing substantially in axial alignment with said driven member on the pump shaft, said driving member being mechanically driven by said motor within said housing and magnetically coupled to said driven member through said bottom imperforate wall to transmit driving force from said sealed motor to said open submerged pump.

19. A submerged motor and pump unit, comprising a motor having a shaft and enclosed in an imperforate sealed housing adapted to be mounted in a fuel tank and to close off the motor from the fuel space in the tank, said housing including a non-magnetic imperforate wall at the end of said motor shaft, a rotary pump outside said imperforate housing and having a pump casing and a pump rotor mounted on a shaft projecting toward said non-magnetic wall, and a pair of permanent magnet coupling members respectively connected to said motor shaft and pump shaft and magnetically coupled through said non-magnetic wall, said motor having a predetermined starting torque and said pump having a predetermined lower operating torque, each coupling member having consecutively alternate magnetic poles at spaced points about the axis of the member, the coupling members having a coupled relation in which each pole lies opposite an unlike pole of the companion member, the coupling torque between said members being less than the motor starting torque and greater than said pump operating torque, and the pull-in torque between said members at motor speed being substantially less than the motor running torque, whereby in the event the pump is stalled the coupling releases and allows the motor to run under little or no load.

(References on following page)

References Cited in the file of this patent

UNITED STATES PATENTS

| | | | |
|---|---|---|---|
| 2,352,958 | Lauer et al. | July 4, | 1944 |
| 2,368,530 | Edwards | Jan. 30, | 1945 |
| 2,369,282 | Curtis et al. | Feb. 13, | 1945 |
| 2,392,128 | Dinsmore | Jan. 1, | 1946 |
| 2,413,546 | Curtis et al. | Dec. 31, | 1946 |
| 2,429,114 | Whitted | Oct. 14, | 1947 |
| 2,481,172 | Staggs | Sept. 6, | 1949 |
| 2,534,520 | Katcher | Dec. 19, | 1950 |

FOREIGN PATENTS

| | | | |
|---|---|---|---|
| 192,618 | Great Britain | Feb. 8, | 1923 |

UNITED STATES PATENT OFFICE
CERTIFICATE OF CORRECTION

May 5, 1959

Patent No. 2,885,126     William L. Hudson

It is hereby certified that error appears in the printed specification of the above numbered patent requiring correction and that the said Letters Patent should read as corrected below.

Column 3, line 57, for "maintins" read -- maintains --; column 13, line 32, for "of agitating" read -- from agitating --; column 14, line 42, for "being", first occurrence, read the syllable -- ber --; line 65, for "couplied" read -- coupled --.

Signed and sealed this 1st day of September 1959.

(SEAL)
Attest:

KARL H. AXLINE
Attesting Officer

ROBERT C. WATSON
Commissioner of Patents